United States Patent [19]
Keith

[11] 3,793,845
[45] Feb. 26, 1974

[54] APPARATUS AND METHOD FOR ANCHORING SUBMERGED CONDUIT

[75] Inventor: James M. Keith, Sunnyvale, Calif.

[73] Assignee: Marcona Corporation, San Francisco, Calif.

[22] Filed: July 20, 1972

[21] Appl. No.: 273,447

[52] U.S. Cl............ 61/72.1, 61/46, 61/72.2, 61/72.3, 114/206
[51] Int. Cl............................................ E02d 15/06
[58] Field of Search............ 61/72.3, 72.1, 46, 72.2; 114/206; 138/105

[56] References Cited
UNITED STATES PATENTS
752,637   2/1904   Mankedick.......................... 61/1 F
3,696,623   10/1972   Heine....................................... 61/38
3,688,510   9/1972   Keating................................. 61/72.3

FOREIGN PATENTS OR APPLICATIONS
1,138,287   10/1962   Germany............................. 61/72.3

Primary Examiner—Jacob Shapiro

[57] ABSTRACT

Elongate flexible envelope draped over submerged conduit defining elongate lobes along side the same which when partially filled with non-soluble particulate matter such as sand serves to anchor the conduit.

12 Claims, 4 Drawing Figures

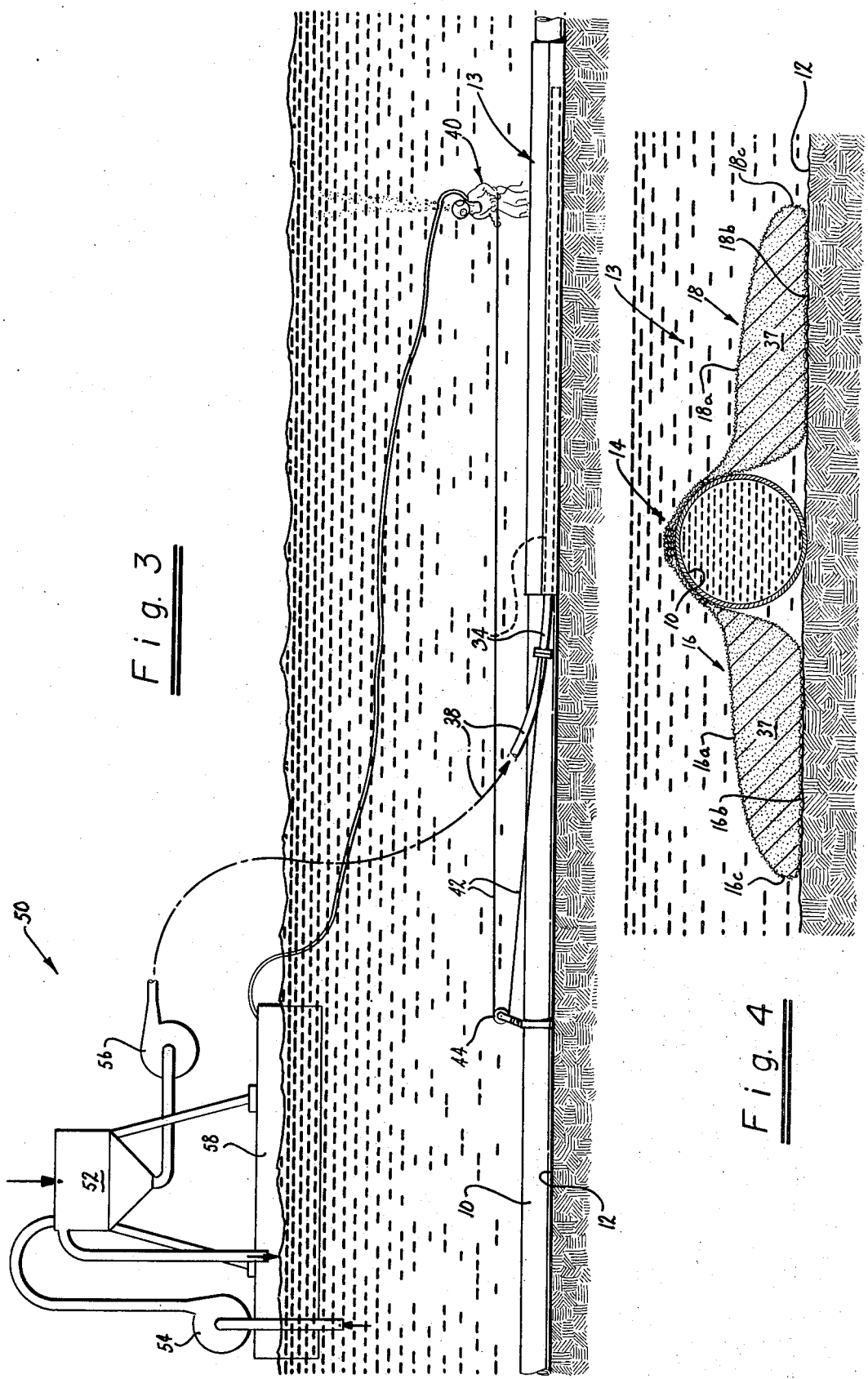

APPARATUS AND METHOD FOR ANCHORING SUBMERGED CONDUIT

BACKGROUND OF THE INVENTION

This invention relates to a system for anchoring submerged conduit, such as a pipeline, beneath a body of water such as on the sea floor.

Recently many uses have been found for submerged conduit, particularly pipelines placed on the sea floor. Such uses include off-shore supply piping for loading ships such as slurry carriers, the loading of tankers and the like, and off-shore gas and oil well delivery systems. The placement of such pipelines has led to various problems due to the tendency of ocean currents of various causes to scour and thereby undermine the pipeline by eroding out the support bed on which it rests. This causes undue strain on the pipeline and eventual breakdown. Anchoring systems have been utilized with discrete components such as anchoring pilings and clamps attached at spaced locations along the pipeline to prevent lateral movement. Such anchoring systems continue to break down due to the aforementioned undermining of the sea bed caused by the interaction of the current with the pipe. Additionally, pipeline weight and cost has often had to be unnecessarily high particularly in oil or gas pumping applications in order to provide sufficient negative bouyancy to enable adequate anchorage. There is therefore a need for a new and improved anchoring system for submerged conduit, especially pipelines.

SUMMARY OF THE INVENTION AND OBJECTS

In general it is an object of the present invention to provide an anchoring system for submerged conduit, such as pipelines, which will overcome the above limitations and disadvantages, using a semi-flexible arrangement resistant to current scouring even in severe weather.

Another object of the present invention is to provide an anchoring system of the above character having high weight, low cost per unit length and which is not subject to rapid deterioration in sea water.

Another object of the invention is to provide an anchoring system of the above character which will restrain submerged conduit or pipeline from movement otherwise caused by bottom currents and water turbulence arising from wave action.

Another object of the invention is to provide an anchoring system of the above character which can be continuously distributed along a submerged pipeline.

Another object of the invention is to provide an anchoring system of the above character which requires no drilling or placement of anchor pilings.

Anchoring apparatus of the present invention is adapted to be used to anchor elongate conduit which has been submerged into a position on the submerged bottom and generally consists of an elongate flexible envelope made of material sufficiently strong to contain a bulk of insoluble particulate solids. The envelope has bottom, side and top wall portions defining a pair of laterally disposed enclosing volumes on each side of the conduit and extending laterally a sufficient distance to enable the same to be draped over the conduit with the enclosing volumes extending laterally away from the conduit and along the adjacent submerged bottom. The envelope extends continuously along a length of substantial section of the conduit and is filled with particulate matter until the envelope assumes a dumbbell shape in cross section with a web portion disposed over the conduit and lobes filled with particulate matter lying on each side thereof on the submerged bottom. The particulate matter serves to weigh down or ballast each side of the envelope and thereby cause the web portion to anchor the interposed section of conduit.

These and other objects and features of the invention will become apparent from the following description and claims when taken in conjunction with the accompanying drawings.

BRIEF DESCRIPTION OF THE DRAWINGS

FIG. 3 is a schematic drawing illustrating the anchor of FIG. 1 during the filling procedure.

FIG. 4 is a cross-sectional view similar of that to FIG. 2 illustrating the completed arrangement and final configuration of a submerged conduit anchor constructed in accordance with the present invention.

DETAILED DESCRIPTION OF THE PREFERRED EMBODIMENT

Figure 1:
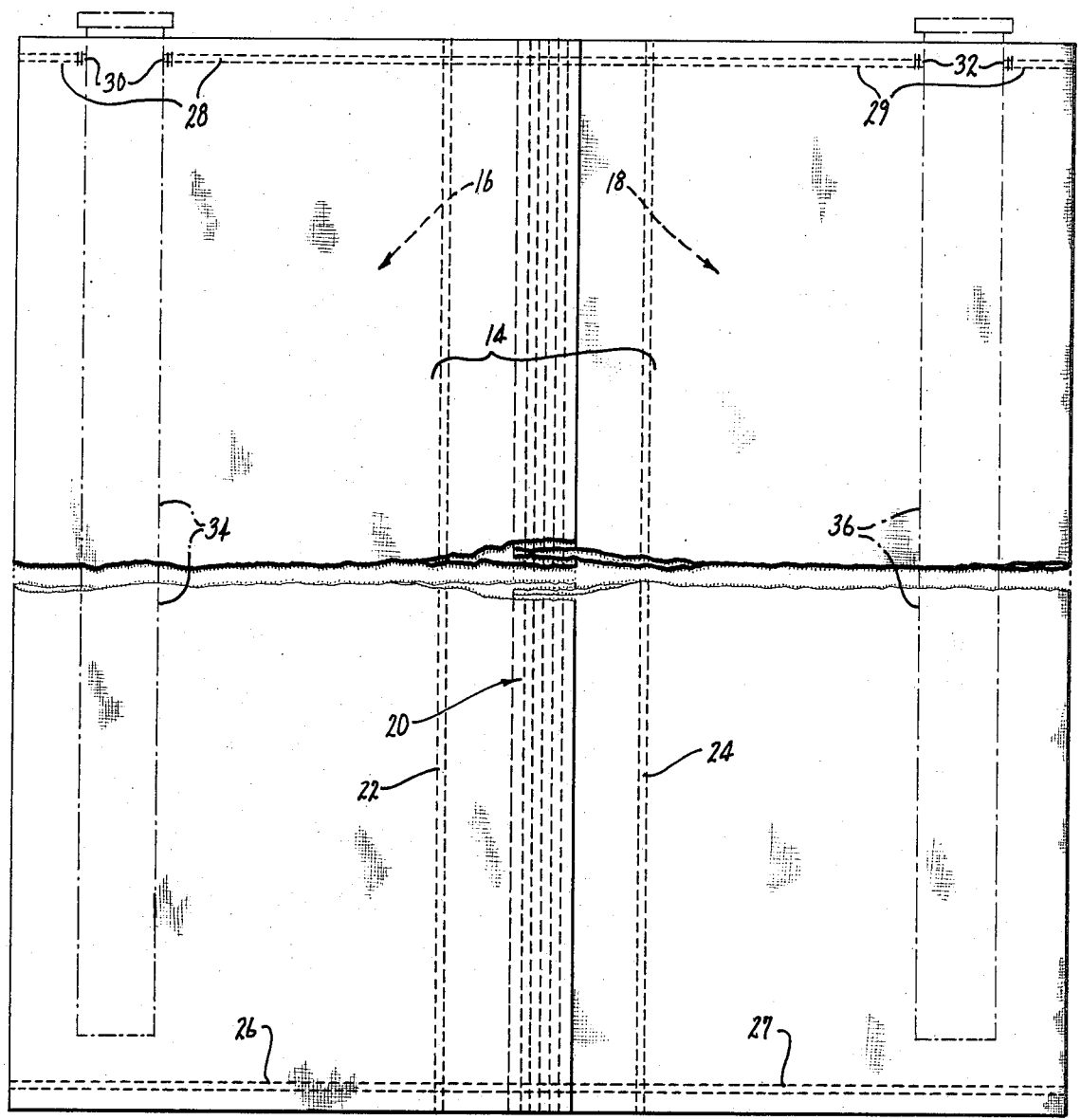
FIG. 1 is a top plan view of the envelope portion of a conduit anchor constructed with accord to the present invention.
Figure 2:
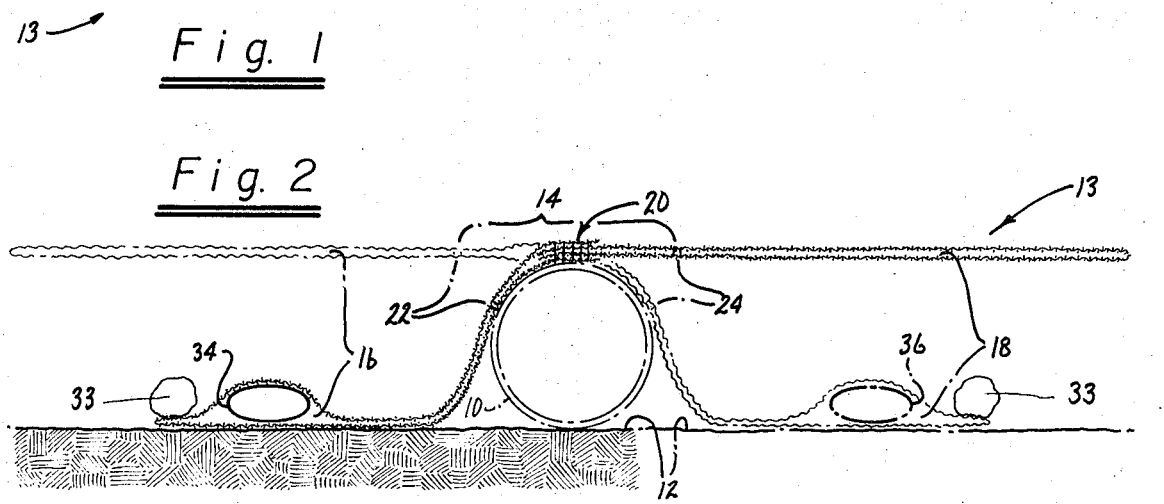
FIG. 2 is a cross-sectional view of the anchor envelope of FIG. 1 showing the same disposed over a pipeline prior to being filled.

Reference is now made to the drawings wherein FIGS. 1 and 2 show the anchor of the present invention in detail. Thus a conduit 10 such as a pipeline is disposed on the submerged bottom 12 where it is desired to be maintained. The anchor of the present invention consists of a flexible envelope made of the material strong enough to contain a bulk of non-soluble particulate solids to be hereinafter described. The envelope has an intermediate web portion 14 interconnecting laterally disposed enclosing volumes or lobes 16, 18 defined by top, bottom and side walls 16a, 16b, 16c and 18a, 18b, 18c. The web portion 14 and the laterally extending lobes 16, 18 are sufficiently wide to enable the web portion to be draped over the conduit with the lobes extending laterally away therefrom for a substantial distance and lying in contact on the submerged bottom 12.

One manner of constructing the anchor envelope of the present invention is more fully illustrated in FIG. 2 which shows a sheet of suitable material formed into a double loop either with itself or with another sheet to form each of the laterally extending lobe portions 16, 18. Each sheet can be made of a rectangular form folded into overlapping relation to generally form side lobes and a middle web portion. The web portion is seamed at 20 along its length as by stitching, or other bonding, and is preferably seamed again along spaced parallel lines at its lateral limits 22, 24 to more fully define the demarkation between the web portion which overlies the conduit and each of lobes 16, 18. Each end of a continuous section of the anchor envelope is also seamed at 26, 27, 28, 29 except for filling ports 30, 32 at one end which are left open until the lobes are loaded.

Depending on the material used, any strong method of seaming will be satisfactory including anti-raveling stitching, adhesive bonding, heat bonding and the like.

In general, the seams required include end seams (aside from filling ports) and at least one lengthwise middle seam. The end seams may take any suitable form including partial folding of the envelope material lengthwise or in other directions. The lengthwise middle seam in the construction shown serves to interconnect the edges of the sheet or sheets into a unitary structure and to define the lobes. The middle seam also serves to prevent migration of particulate material between the lobes. In the latter function, such a seam can be placed anywhere in the web portion and for example, is entirely served by the spaced parallel seams 22, 24.

The material of which the envelope is made can be either permeable or impermeable depending upon the procedure selected for filling it. Permeable materials are available which provide good strength retention and do not deteriorate in sea water, an example being lattice or woven sheet of plastic cloth, such as "Filter X" plastic filter cloth as made by Carthage Mills of Cincinati, Ohio.

Any various non-porus materials are also satisfactory, such as polyethelene sheets.

After the conduit 10 has been laid, the unfilled anchoring envelope 13 is draped over the conduit and held in place for example by temporary weights 33 as shown in FIG. 2, flexible filling hoses 34, 36 inserted within each respective filling port extending the length of each of lobes 16, 18, shown particularly in FIG. 3. The filling hoses are connected to a source of slurry of particulate material 37 through a filling line 38.

The particulate matter is selected to be non-soluble, pulpable into a slurry and as heavy (dense) as cost will permit. In some applications, sand indigenous to the location is suitable, while certain ore-bearing sands, such as the so called "black sand" containing iron deposits, are preferred.

FIG. 3 illustrates the filling of an envelope 13 made of permeable sheeting. The filling tube 38 is connected to the source of water slurry containing the particulate material to be used. The slurry is then pumped into the envelope and the filling tube withdrawn from the envelope at a rate such that the desired bulk of material is deposited, the suspending water escaping through the permeable envelope to leave the sand in place. The foregoing can be readily accomplished using a diver 40 to manipulate the hoses 34, 36 and withdraw the same when the desired degree of filling has been achieved. The diver can sense this condition by standing on the freshly filled portion of the envelope, and withdraws the filling tube using a handline 42 reeved over a snatch block 44 mounted on a sufficiently distant portion of the conduit. Once the parameters for filling (i.e., the amount per lineal foot) are established for a given size of anchor, automatic remote filling with the proper amount of sand is possible by measurement.

The slurry can be provided by any suitable means such as a slurry forming station 50 including a tank 52, water take up pump 54 and slurry pump 56 mounted on a surface borne barge 58, as shown in FIG. 3.

It is also believed possible to use impermeable sheeting to form the envelope. In this construction liquid relief openings would have to be provided at the end away from the filling ports and the filling tube can remain fixed, projecting only slightly into the envelope. In filling the envelope slurry is supplied on the upper side of the filling end of inlet and the particulate material such as sand settles out near the inlet until the cross section has decreased so much that a small stream of slurry moves across the accreted material beneath, the latter enlarging until the lobe is filled. The volume occupied by the slurry stream eventually becomes the available relief so that the lobe remains filled or loaded to less than full capacity and therefore semi-flexible and capable of conforming to the submerged bottom contour.

Thus, there has been illustrated and disclosed a novel anchoring system for confining and stabilizing the position of submerged conduit. The anchoring system of the present invention possesses numerous advantages including relatively low cost and is especially effective in supplying high density ballast to submerged pipelines particularly where such pipelines convey light material, such as oil or gas. The present invention also provides a seal which generally conforms to the contour of the submerged bottom along continuous paths on each side of the pipe which is sufficiently flexible to maintain that contact against the potential scouring action caused by the currents. A particular advantage of the present anchoring system is that it does not require drilling or placement of anchor pilings and this alone is believed to result in substantial savings over existing anchoring systems.

To those skilled to the art in which the present invention pertains, many modifications and adaptations thereof will occur. Accordingly it is not intended that the specific embodiments disclosed herein should be taken in a limiting sense; rather the spirit and scope of the invention should be interpreted with reference to the appended claims as interpreted by the foregoing specification.

I claim:

1. In combination, anchoring apparatus and an elongate conduit submerged into a position on a submerged bottom, said anchoring apparatus comprising an elongate flexible envelope made of material strong enough to contain a bulk of non-soluble particulate solids, said flexible envelope having wall portions defining a pair of laterally disposed longitudinally extending enclosing volumes on each side of said conduit and having a shape sufficiently wide to enable the same to be draped over said conduit with said enclosing volumes extending continuously along each side thereof laterally away from the conduit along the adjacent submerged floor, said envelope and enclosing volumes extending continuously along the length of a section of said conduit, a quantity of particulate matter disposed in each of said enclosing volumes whereby the envelope assumes a dumbbell shape in cross section with lobes lying on each side and a web portion disposed between said volumes over said conduit, said particulate matter serving to weigh down each of said lobe portions, the web portion to thereby anchor the interposed section of conduit.

2. In combination a submerged elongate conduit and anchoring apparatus for holding said elongate conduit submerged in position on a submerged bottom, said anchoring apparatus comprising an elongate flexible envelope made of material strong enough to contain a bulk of non-soluble particulate solids, said flexible envelope having wall portions defining a pair of laterally disposed lobes on each side of said conduit and having a shape sufficiently wide to enable the same to drape over said conduit with said lobes lying on opposite sides thereof and extending laterally away from the conduit along the adjacent submerged bottom, said envelope and lobes extending continuously along the length of a section of said conduit, means forming a seam along the length of said envelope and between said lobes to separate said lobes and thereby prevent migration of material therebetween, a quantity of particulate material disposed in each of said lobes so that the envelope assumes a dumbbell shape in cross section, said particulate matter serving to weigh down each of said lobes and thereby anchor the interposed section of conduit by a lateral and downward restraining on the portion between said lobes and overlying said conduit.

3. Anchoring apparatus as in claim 2 in which said envelope is made of sheeting having a liquid permeable structure such that water can pass through such sheeting but particulate material is retained thereby.

4. Anchoring apparatus as in claim 3 in which said sheeting consists of a woven plastic filter cloth.

5. Anchoring apparatus as in claim 2 in which said particulate matter is sand.

6. Anchoring apparatus as in claim 5 in which said sand is of the mineral containing, high density type.

7. Anchoring apparatus as in claim 2 in which said envelope is only partially filled so that the enclosed volume remains flexible and capable of conforming to the contour of the sea bottom.

8. Anchoring apparatus as in claim 2 in which said elongate flexible envelope is continuous along substantial length of said conduit.

9. Anchoring apparatus as in claim 2 further including means for delivering a slurry of said particulate matter to said envelope when the same is draped in situ over said submerged conduit.

10. In a method for anchoring submerged conduit on the submerged bottom, laying an elongate envelope over said conduit said envelope having a central web portion and laterally extending lobe portions, the lobe portions defining enclosing volumes for particulate non-soluble solid material, pumping a slurry of said particulate solid material into said lobe portions, while simultaneously withdrawing the suspending liquid from said slurry within each lobe portion to thereby at least partially fill each lobe with particulate material.

11. A method as in claim 10 in which said filling step is terminated prior to each lobe attaining a fully filled conformation whereby each lobe is capable of deformation to conform to the contour of the sea bottom on which it is laid.

12. A method for anchoring submerged conduit as in claim 10 in which said envelope is constructed of permeable material, and in which a filling hose is disposed through the length of said lobe portions, and further including the step of simultaneously withdrawing hose as the slurry is delivered therethrough such that each of said lobes is only partially filled.

* * * * *